No. 780,901.　　　　　　　　　　　　　　　　　Patented January 24, 1905.

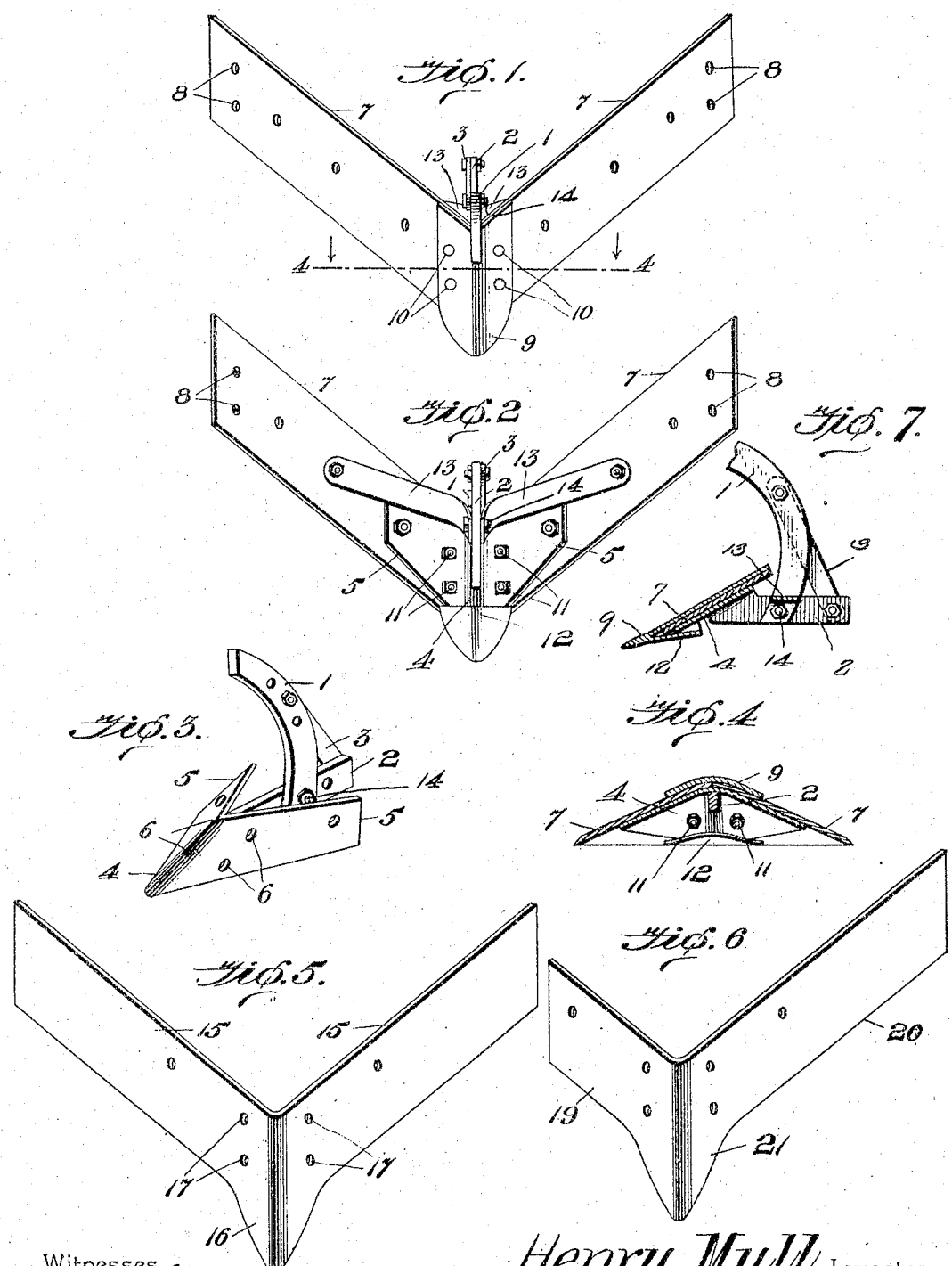

UNITED STATES PATENT OFFICE.

HENRY MULL, OF ASHLAND, KANSAS.

PLOW.

SPECIFICATION forming part of Letters Patent No. 780,901, dated January 24, 1905.

Application filed July 29, 1904. Serial No. 218,715.

*To all whom it may concern:*

Be it known that I, HENRY MULL, a citizen of the United States, residing at Ashland, in the county of Clark and State of Kansas, have invented a new and useful Plow, of which the following is a specification.

This invention relates to implements for tilling the soil, and it has special reference to an improved plow which shall be adapted to loosen and to break the surface soil preparatory to the planting of the crops.

In large sections of the country it is found that the surface soil will be completely dried out by the hot and dry winds, while a comparatively short distance below the surface moisture will be found. By deep plowing the soil will be turned over and the moist portion will be exposed to the drying influence of the atmosphere, making it impossible for seeds planted therein to germinate successfully. To overcome this difficulty, it has become common to break the surface soil prior to planting by means of disk harrows and similar implements; but this method of operation involves heavy and hard labor.

The object of the invention is to enable soil of the character described to be successfully tilled by raising the surface thereof and permitting it again to drop, thereby breaking the clods and disintegrating the soil to prepare it for planting, this being accomplished by the use of the plow which is the subject of the present invention.

With the ends above set forth in view the invention consists in the improved construction and novel arrangement and combination of parts, which will be hereinafter fully described, and particularly pointed out in the claim.

In the accompanying drawings has been illustrated a simple and preferred form of embodiment of the invention, it being understood, however, that no limitation is necessarily made to the precise structural details therein exhibited, but that the right is reserved to any changes, alterations, and modifications to which recourse may be had without departing from the spirit or sacrificing the efficiency of the same.

In said drawings, Figure 1 is a plan view of a plow constructed in accordance with the principles of the invention. Fig. 2 is a bottom plan view of the same. Fig. 3 is a perspective view of the plow foot or frog and the lower part of the standard to which it is attached. Fig. 4 is a transverse sectional view taken on the line 4 4 in Fig. 1. Fig. 5 is a plan view showing a modified form of the plow-blade. Fig. 6 is a plan view showing a modified form of the blade which is usually employed in gangs. Fig. 7 is a longitudinal sectional detail view of the device as shown in Fig. 1.

Corresponding parts in the several figures are indicated by similar characters of reference.

An ordinary plow-standard (shown at 1) is provided at the lower end thereof with a horizontally-disposed heel-piece or landside 2, the rear end of which is connected with a standard by means of a brace 3.

Upon the front end of the landside 2 is mounted and permanently secured a base-plate which I call the "frog" 4, said frog consisting of a steel plate firmly secured in position upon the point of the landside and having laterally-extending wings 5, said wings being provided with perforations 6 6 for the reception of bolts.

7 7 designate the wings of the plow, which consist of steel plates rhomboidal in shape and provided at both ends with bolt holes or perforations 8 8, corresponding with the perforations 6 in the frog, with which the said wings or plow-blades may thus be reversibly connected, said blades being provided with cutting edges at both their upper and their lower edges.

9 designates the point having perforations 10. The point is adapted to overlap the meeting ends of the blades 7 7 and to connect it with the latter and with the frogs by means of bolts 11 passing through the perforations 10, 8, and 6 in the point, the wings, and the frog, respectively. The point 9 is provided on its under side with a pocket 12 for the reception of the lower extremities of the wings or blades. It will thus be seen that the proximate ends or points of the wings or blades will be protected not only by being inserted into the pocket of the plow-point, but also by being overlapped by said point upon the upper side and by the frog upon the under side. In addition to being secured upon the frog by means of the bolts 11 the wings are braced and secured by means of cross bars or braces 13, connecting said wings or blades with the bolt 14, which connects the standard 1 with the landside 2.

In operation the wings or blades of the plow are set at any desired upward and rearward inclination, which is determined by the position of the frog, which may be regulated by tilting the landside more or less with relation to the standard. The plow-point and the edges of the wings or blades being sufficiently sharpened, the plow when draft is applied will readily cut into the soil, the surface of which will be lifted and elevated and caused to drop over the rear edges of the blades, being thus sufficiently broken and disintegrated. I desire it to be particularly understood that the soil is not turned, but merely broken by the action of this device. Thus when the land is in stubble the stubble will furnish a valuable mulching for the land, and it will be found extremely valuable in preventing the seed subsequently planted from being blown out of the ground by the high winds which are so prevalent in sections of the country for which this improved plow is specially intended. When the seed is drilled into the soil, it will be deposited in a comparatively moist stratum of the latter, which will insure its early and successful germination.

Under the modification illustrated in Fig. 5 of the drawings the wings or blades, here designated 15, and the point 16 of the plow are made from a single piece of steel provided with suitably-disposed perforations 17 for the reception of the bolts, whereby this plow may be bolted directly upon the frog connected with the standard. This construction is less expensive, inasmuch as the special formation of the point with a pocket or receptacle in its under side is thereby avoided.

In Fig. 6 another modification has been illustrated, whereby the construction of the plow is specially adapted for use in gangs of any desired number. Under this modification one of the wings, here designated 19, of the plow is made considerably shorter than the other wing, 20, said wings being formed integral with each other and with the point 21. With this construction a gang of any desired number of units may be used, the short blade of each unit being disposed to overlap the long blade of the unit in front thereof, as will be readily understood.

I desire it to be understood that this improved plow may be made in different sizes and that it may be utilized as a walking, a riding, or a gang plow within the scope of the invention.

Having thus described the invention, what is claimed is—

In a plow of the class described, the combination with a landside having a frog which constitutes a supporting member, of wings, forming moldboards, supported upon and completely overlapping said frog, an earth-engaging point superimposed upon said wings and having in its under side a recess accommodating the points of the wings, and connecting-bolts extending through the frog the wings and the point.

In testimony that I claim the foregoing as my own I have hereto affixed my signature in the presence of two witnesses.

HENRY MULL.

Witnesses:
H. C. MAYSE,
ROBT. C. MAYSE.